United States Patent [19]

Everhart

[11] 4,016,458
[45] Apr. 5, 1977

[54] RADIO FREQUENCY DISTRIBUTION NETWORK STANDBY POWER SYSTEM WITH OVERVOLTAGE PROTECTION

[75] Inventor: Norman Everhart, Richboro, Pa.

[73] Assignee: Jerrold Electronics Corporation, Horsham, Pa.

[22] Filed: Jan. 28, 1976

[21] Appl. No.: 653,088

Related U.S. Application Data

[63] Continuation-in-part of Ser. No. 543,452, Jan. 23, 1975, Pat. No. 3,979,644.

[52] U.S. Cl. .................................. 361/52; 321/21; 323/17; 361/59; 361/18
[51] Int. Cl.² .................................... H02H 9/04
[58] Field of Search ................ 317/20, 22, 23, 31, 317/33 VR, 33 SC, DIG. 5; 321/21; 323/17, 24, 25; 330/207 P; 307/66

[56] References Cited

UNITED STATES PATENTS

| | | | |
|---|---|---|---|
| 3,299,321 | 1/1967 | Damon | 317/31 X |
| 3,408,552 | 10/1968 | Weber | 317/31 X |
| 3,571,608 | 3/1971 | Hurd | 317/31 X |
| 3,742,337 | 6/1973 | Digneffe | 323/24 X |

Primary Examiner—Harry Moose

[57] ABSTRACT

An improved overvoltage protection circuit for cascaded radio frequency signal distributing amplifiers interrupts a power transmission path in an open circuit mode responsive to an overrange input power potential, and is automatically reset to its quiescent operative condition when the overvoltage condition abates. AC energy is coupled by the instant arrangement at a reduced level while the fault condition persists, such that the driven load is continuously energized.

In accordance with one aspect of the present invention, selective relatively essential ones of the distribution amplifiers, e.g. trunk amplifiers, can be maintained operative by a DC standby power supply during an AC line power hiatus. Correspondingly, other, less important amplifiers are automatically rendered inoperative during power faults to prevent excessive drain in the DC standby source.

18 Claims, 7 Drawing Figures

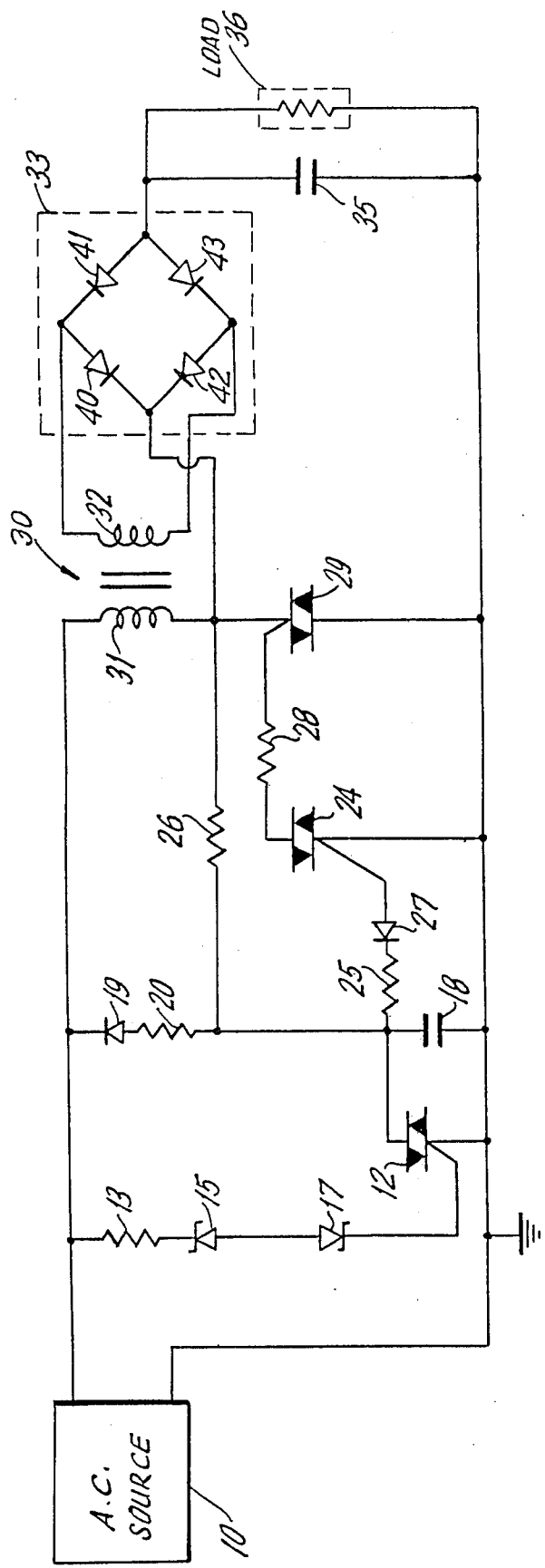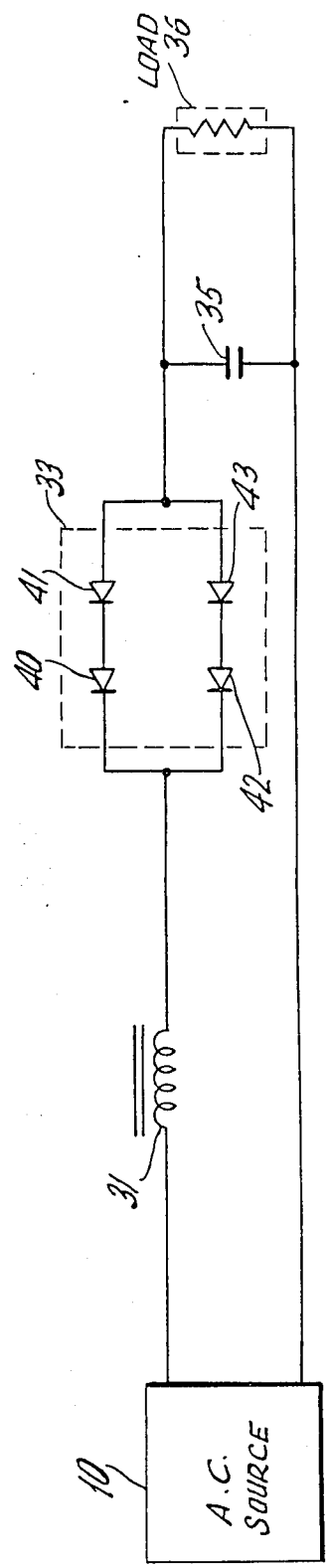
FIG. 3A
FIG. 3B

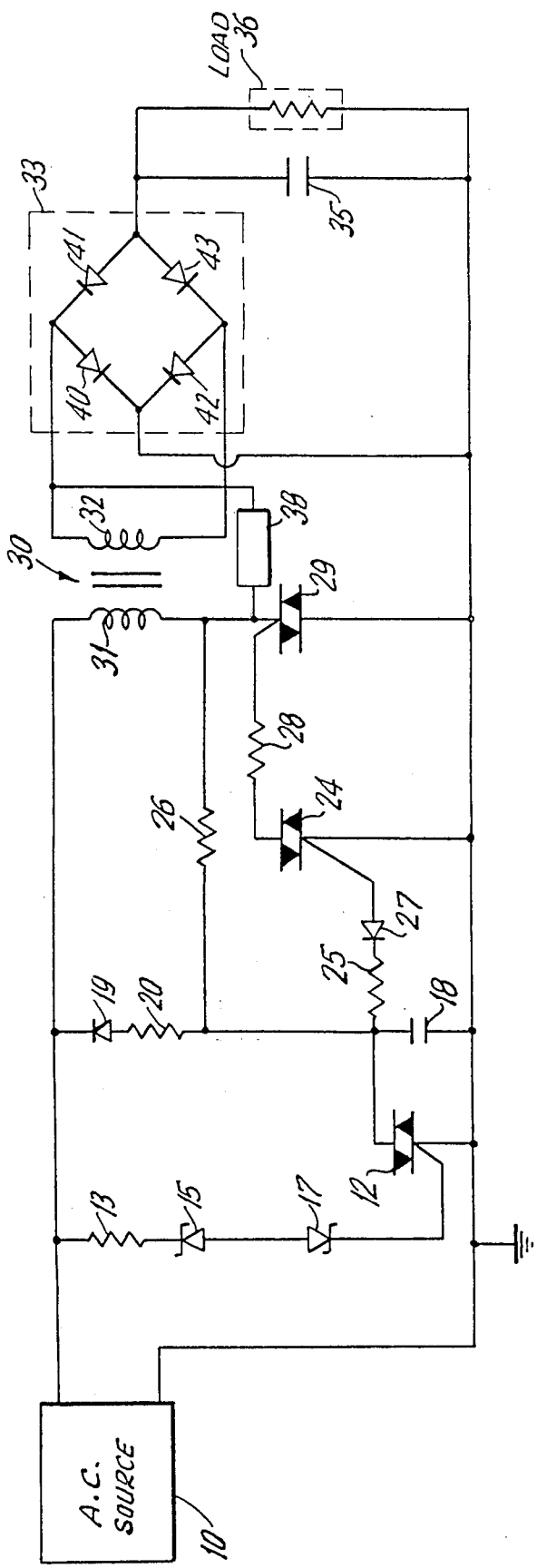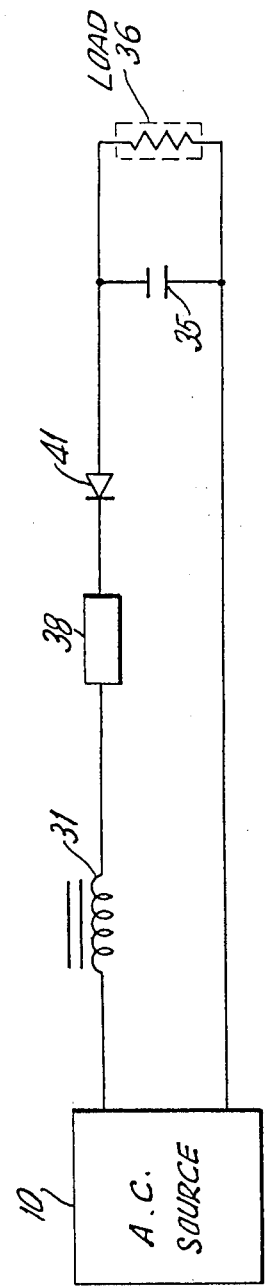
FIG. 4A
FIG. 4B

RADIO FREQUENCY DISTRIBUTION NETWORK STANDBY POWER SYSTEM WITH OVERVOLTAGE PROTECTION

This application is a continuation-in-part of my copending application Ser. No. 543,452 filed Jan. 23, 1975 entitled "Improved Overvoltage Protection Arrangement", now U.S. Pat. No. 3,979,644.

DISCLOSURE OF THE INVENTION

This invention relates to electronic circuits and, more specifically, to improved radio frequency signal distribution amplifier overvoltage protection and stand-by power distribution circuitry which is automatically reset when the overvoltage fault condition ends; which maintains power flow during the period of the overvoltage; and wherein D.C. stand-by power is supplied to preselected amplifier during an A. C. line voltage interruption.

In many applications of present day interest, e.g., in the operation of R.F. distribution equipment as in a CATV system, a protective mechanism is desirable to insulate sensitive electronic active elements from potentially destructive overvoltage conditions. Thus, for example, CATV systems have historically had to accommodate overvoltage conditions caused by imbalances in a power distribution system of a community being served, electrical storms, or the like.

By reason of such line voltage surges, a so-called "crowbar" voltage protection circuit has been employed, wherein a power conducting semiconductor such as a silicon controlled rectifier, triac, power transistor or the like has been turned on via a voltage sensing device or circuit connected to the control port of the power element. When fired responsive to an overvoltage condition, the SCR, triac or the like fires to create a short-circuit across the power flow channel. This low impedance bridged across the power channel totally disables the power supply, thereby protecting — but also totally disabling — the protected equipment. In such prior art apparatus when the fault overvoltage condition abates, the power supply is reset, either manually or automatically, as when thermal breakers opened by the fired crowbar circuit reset. Such crowbar type of operation has induced large spurious voltage transients in systems; has often led to fuse and breaker and failure requiring maintenance visits to often remotely located line amplifiers and the like; and, as above stated, totally disables the protected equipment for the entire duration of the overvoltage condition. In a CATV context, R.F. services are interrupted as long as the fault condition obtains, and until the crowbar shorting element is reset.

It is an object first of the present invention to provide improved overvoltage protection apparatus.

More specifically, it is an object of the present invention to provide improved overvoltage protection circuitry which is automatically reset when an overvoltage condition terminates; which does not operate in a crowbar mode, i.e., does not place a short-circuit across a power channel; and which continues to supply energy during the overvoltage condition.

It is a further object of the present invention to provide radio frequency amplifier power supply circuitry operative directly from a D. C. stand-by source, rather than from an A. C. stand-by source powered by a storage battery, thus saving the cost of the otherwise requisite D.C. -to- A.C. convertor, with its attendant inefficiencies.

It is another object of the present invention to provide radio frequency video distribution amplifier powering circuitry which accommodates line overvoltage conditions; and which permits programming line amplifiers for an on/off status during periods of A.C. line power interruption to enhance the useful output period of a stand-by D.C. power source, e.g., which turns off line extenders or the like during a line power hiatus while preserving trunk line integrity.

The above, and other objects of the present invention are realized in specific, illustrative overvoltage protective circuitry wherein power supplying circuitry, as for CATV distribution equipment (e.g., repeater amplifier) includes a transformer coupled to an AC power line. A controlled bilaterally conducting switching device such as a triac connects the primary winding of the transformer to the AC source, and the transformer secondary services any conventional DC power supply, e.g., a diode full wave bridge, filter capacitor, and/or the like. When power is first applied, a control capacitor charges to a level sufficient to turn on the triac, thereby connecting the primary transformer winding to the AC source and affording power to the serviced equipment.

A further normally nonconductive controlled switch, e.g., an additional triac, is connected across the enabling capacitor, and is gated by overvoltage sensing elements or circuitry, e.g., voltage threshold conducting Zener diodes. When an overvoltage condition is sensed, the additional triac conducts, thereby discharging the control capacitor and turning off the main conducting power triac. This operatively disconnects the transformer primary winding from one side of the AC line during the term of the fault condition, hence protecting the subject equipment during the voltage surge.

In accordance with various further aspects of the instant invention, additional circuitry becomes operative when the power triac is nonconductive during a fault condition to continue the supply of energy (but at a reduced voltage level) to the serviced equipment. Thus, the protected equipment continuously performs. Further, such additional circuitry may selectively render the subject short distribution amplifier operative or inoperative during AC line failure. Thus, for example, main line trunk amplifier may be adapted to continue operation during DC stand-by power intervals while line extender or the like are inoperative, thereby inhibiting excessive standby power drain and preserving system integrity to the maximum extent possible.

The above and other features and advantages of the present invention will become more clear from the following detailed description of specific illustrative embodiments thereof, present hereinbelow in conjunction with the accompanying drawing, in which:

FIG. 3A is a schematic diagram depicting overvoltage protective circuitry of the FIG. 1 type, further comprising second additional circuitry for maintaining power flow during a fault condition;

FIG. 3B is a schematic diagram operatively characterizing performance of the FIG. 3A circuitry during a fault condition;

Figure 1:
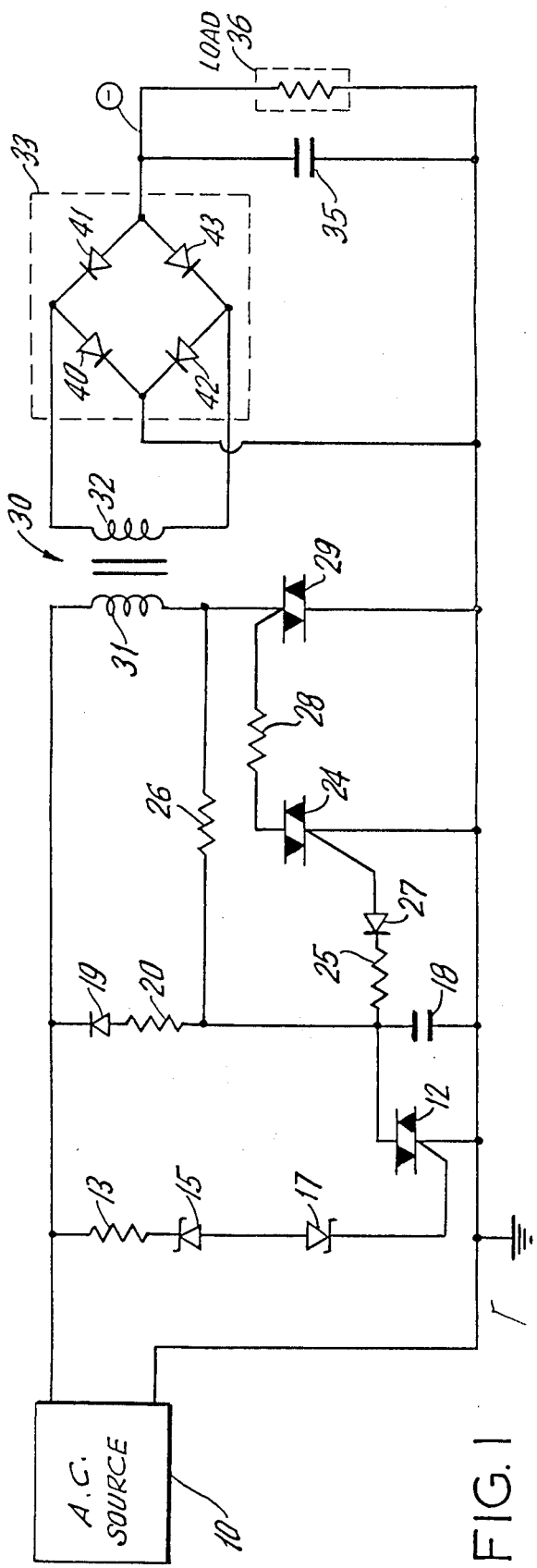
FIG. 1 is a schematic diagram of basic overvoltage protection circuitry employing the principles of the present invention.
Figure 5:
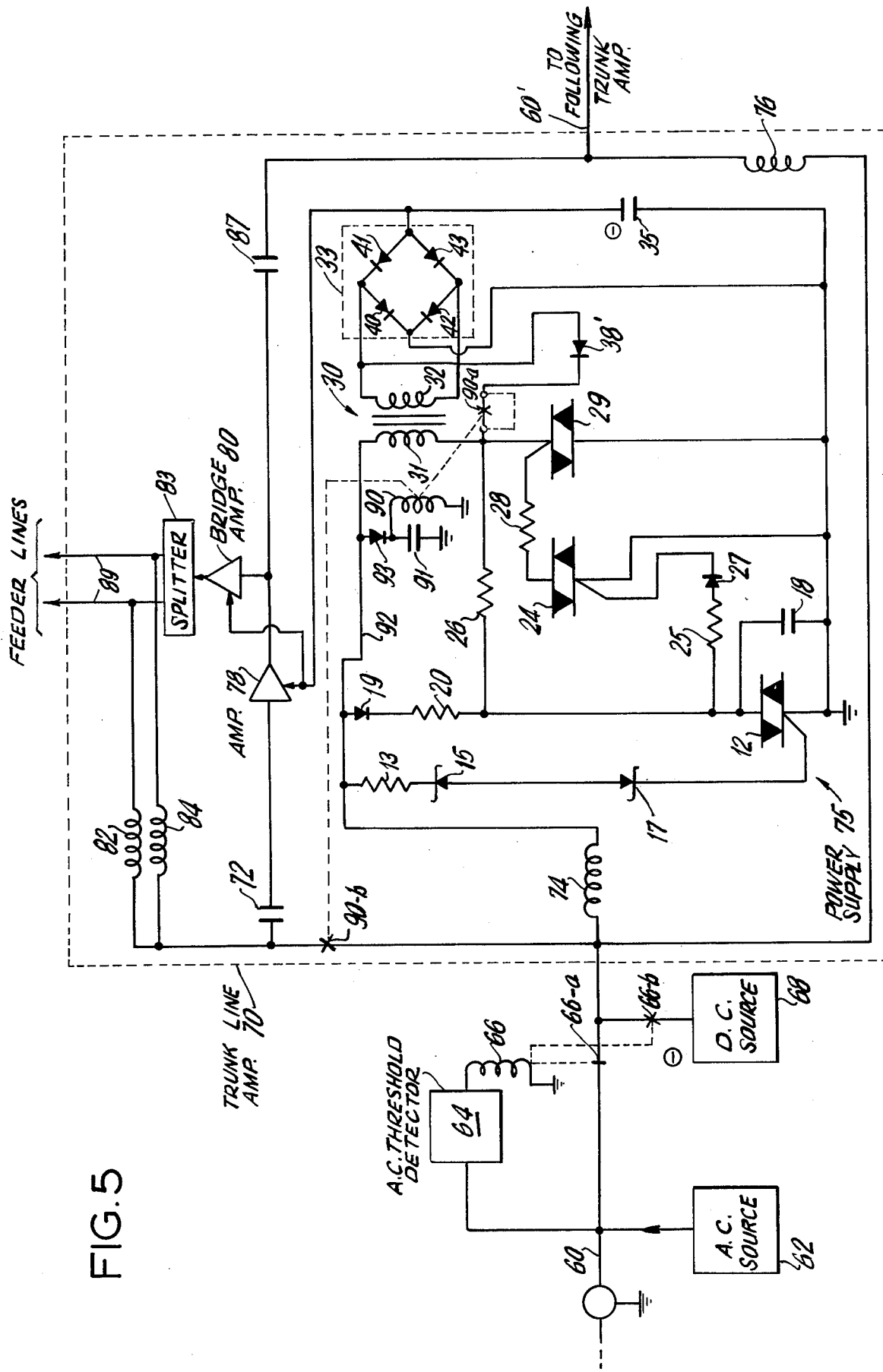

FIG. 4A schematically depicts overvoltage protection circuitry of the FIG. 1 type, further including third additional circuitry for maintaining power flow during a fault condition;

FIG. 4B is a schematic diagram operatively characterizing performance of the FIG. 4A circuitry during a fault condition; and FIG. 5 is a schematic diagram depicting the instant power supply circuitry employed to maintain selected radio frequency CATV trunk amplifier operations from a DC standby source during AC line power failure intervals.

Throughout the several figures, like elements are identified by like reference numerals.

Referring now to FIG. 1, there is shown specific illustrative overvoltage protecting circuitry employed to supply power from an AC source 10 to a load 36 (after conversion to a direct current potential), while protecting the load 36 against an overvoltage supplied by the source 10. To this end, the AC energy supplied by the source 10 is coupled to the primary winding 31 of a transformer 30. The voltage at the transformer secondary winding 32 is converted to DC for end use, as via a full wave diode bridge 33 and filter capacitor 35. A voltage regulator or the like may, of course, be disposed between the capacitor 35 and the load 36.

The main terminal-1, terminal-2 conduction path of a power triac 29 connects the bottom terminal of the transformer primary winding 31 to one side of the AC source line (assumed for convenience only to grounded), the other side of the winding being connected directly to the other AC line. The gate, control port of the power triac 29 is selectively energized as described below by a resistor 28 and a triac 24 which, in turn, has its gate energized by the voltage across a capacitor 18 acting through a resistor 25 and a diode 27. The capacitor 18 is charged during negative AC line half cycles by a resistor 20 and a diode 19.

For overvoltage protection purposes, a triac 12 is connected in parallel with a capacitor 18. The control port of the triac 12 is connected to the AC line via oppositely poled Zener diodes 15 and 17 and a current limiting resistor 13. The voltage conducting threshold levels of the Zener diodes 15 and 17 correspond to the overvoltage points to be detected at the output of the source 10.

When (as is normally the case) AC energy of an amplitude below the overvoltage fault level is applied to the circuit of FIG. 1, the capacitor 18 charges during negative line half cycles to a level sufficient to energize the gate of the triac 24 through the resistor 25 and diode 27. The negative potential at the upper end of the capacitor 18 persists for both line half cycles, continuously gating the triac 24 conductive. The conducting triac 24 in turn supplies sufficient energy to the control port of the power triac 29 to render it conductive, thereby operatively connecting the lower end of the transformer primary winding 31 to the ground side of the AC source 10 output. Substantially the full output of the source 10 is thus supplied to the primary winding 31. The fully energized transformer and the following circuitry then generate a DC potential for exciting the load 36 in a conventional manner.

During such normal input potential conditions as above described, the maximum voltage excursion during each half cycle supplied by the AC source 10 is insufficient to fire the reversely poled (for that half cycle) one of the Zener diodes 15 or 17. Thus, the triac 12 remains nonconductive and does not affect the circuit operation above described.

However, when an overvoltage is encountered during any line half cycle, the reversely directed diode 15 or 17 does conduct and, the other cascaded diode 15 or 17 being forward biased, the gate of the triac 12 is energized. Accordingly, the capacitor 18 rapidly discharges through the terminal-1, terminal-2 conductive path of the triac 12, thereby obviating the negative potential normally present at the upper terminal of the capacitor 18 in the drawing. This turns triacs 24 and 29 off, operatively disconnecting the transformer primary winding 31 from the AC source 10. Accordingly, potential is removed from the power supply and load, hence protecting the load as long as the overvoltage condition exists. Protection is afforded by an open circuit rather than by crowbar short-circuit mode, therefore minimizing electrical transients when an overvoltage condition is encountered.

When the overvoltage condition abates, the gate of the triac 12 is no longer energized and the triac 12 ceases to conduct at about the next zero crossing of the AC wave supplied by the source 10, at which point the terminal-1, terminal-2 potential is insufficient to further sustain conduction. To this end, a resistor 26 aids in supplying the zero going, polarity reversing potential to the triac 12. Thus, following cessation of the overvoltage condition, the capacitor 18 again charges to its condition above discussed such that the flow of energy to the load resumes in a normal manner.

Figure 2:
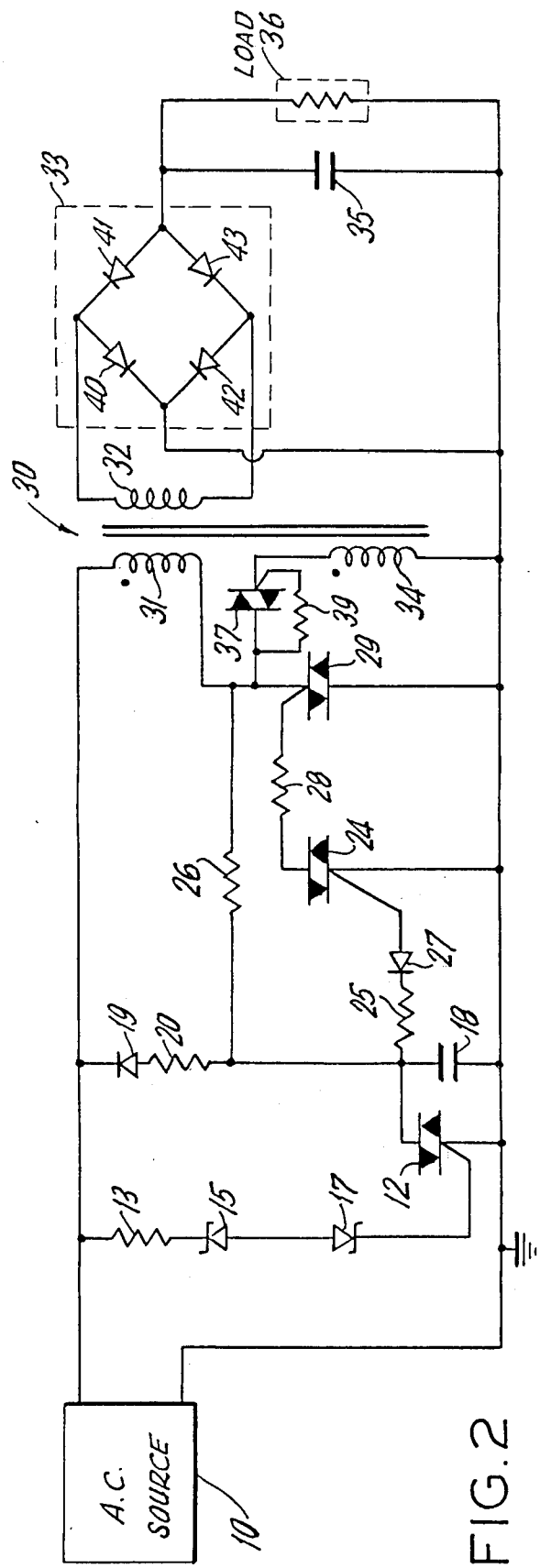
FIG. 2 is a schematic diagram of overvoltage protective circuitry of the FIG. 1 type, further including first additional circuitry for maintaining power flow during an overvoltage fault condition.

The basic overvoltage protection circuit illustrated in FIG. 1 and described above thus fully protects the load, but does not supply energy to the load 36 during the period of the overvoltage condition. To this end, and referring now to the circuit arrangement FIG. 2, a further transformer primary winding 34 and a triac 37 may be connected in parallel with the main power triac 29 of the basic FIG. 1 arrangement. When an overvoltage condition is encountered, the triac 29 becomes nonconductive in the manner above considered. Accordingly, the triac 37 initially has the AC source potential supplied thereacross and quickly fires via the excitement supplied by a gate resistor 39. With the triac 37 conductive, the winding 34 is operatively connected in a series aiding relationship with the winding 31 such that the effective turns ratio of the transformer changes from its quiescent value of $$\frac{N32}{N31} \text{ to } \frac{N_{32}}{N_{31} + N_{34}},$$

wherein N represents the number of turns in the indicated winding. Thus, the potential supplied at the output of the transformer 32 is markedly reduced during the term of the overvoltage fault.

When the fault clears, the principal power triac 29 again fires in the manner above described to short-circuit the triac 37 and the winding 34, such that potential output of the transformer secondary winding 32 resumes its normal level. Thus, the circuitry of FIG. 2 not only protects against overvoltage condition — it also assures a continuation of energy (but at a lower level) while the fault condition obtains.

A further alternative circuit arrangement for continuing power flow during the period of overvoltage condition is shown in FIG. 3A, wherein one bridge 33 node is connected to the winding 31 — triac 29 junction, rather than to the grounded AC power line. During normal operation, the bottom terminal of the winding 31 and the full wave bridge node at the junction of the rectifier diodes 40 and 42 are grounded, and perform in the conventional manner above described. However, when an overvoltage condition is sensed, the triac 29 becomes open circuited, and the circuitry of FIG. 3A operatively assumes the configuration shown in FIG. 3B. The primary winding 31 of transformer 30 in essence functions as a series inductance, and the power supply capacitor 35 is charged by half wave rectification performed by the bridge diodes, which are effectively connected as two cascaded diodes in each of two parallel paths. Load 36 thus continues to be energized with a DC potential which is reduced from its former normal level (absent regulation) and which assumes a value something below that instantly supplied by the AC source 10 during the fault condition. Again, when the fault condition clears, the triac 29 again conducts, and the composite circuit performs in its conventional mode.

It is observed that the direct connection between the bridge 33 and transformer 31 — triac 29 node should normally be employed only when the transformer 30 operates in a step-up mode, i.e., where the winding 32 includes a greater number of turns than the winding 31 such that the output potential supplied by winding 32 exceeds that which drives winding 31. If the arrangement of FIG. 3A is attempted where an isolation or stepdown transformer mode is employed, the overvoltage supplied by the source 10 during a fault condition might itself be sufficient when reflected across the capacitor 35, to harm the load 36.

A still further embodiment of the instant invention for protecting a load during overvoltage conditions, and for continuously supplying power to a load during such a condition, is shown in FIG. 4A. The arrangement is substantially the same as shown in FIG. 3A, except that a device or network 38 is connected between the rectifier bridge 33 node connected to the upper end of the transformer secondary winding 32, and the junction between the primary winding 31 and the triac 29. Again, the circuit operates in the manner above described when no overvoltage is present. The network 38 (discussed below both structurally and functionally) simply at most comprises an additional load on the transformer secondary during normal circuit functioning.

When an overvoltage condition is present, the triac 29 becomes open circuited as above discussed, and the circuit of FIG. 4A effectively assumes the configuration shown in FIG. 4B. As was the case for the circuitry of FIGS. 3A – 3B, the transformer primary winding 31 becomes an effective series inductor, and the capacitor 35 and one bridge diode 41 act as a half-wave DC rectifier and filter to supply energy to the load 36 while the overvoltage condition is present. The element 38 is serially employed to reduce the potential developed across the capacitor 35 during the overvoltage condition (assuming an isolation or step-down transformer). The element 38 may comprise a Zener diode to simply drop potential; a capacitor for acting as a voltage divider with the capacitor 35; a voltage dropping resistor; a diode poled in the same direction as the bridge diodes (for a step-up transformer where only coupling and not series voltage reduction is required); or the like. Thus, by utilizing the voltage dropping and/or coupling element or network 38, the load 36 may be continuously energized during the fault condition.

As discussed repeatedly above when the fault cures, the triac 29 again conducts and the circuit of FIG. 4A resumes normal operation.

The above described arrangements have thus been shown to protect a load against overvoltage conditions; and to also provide a continuous flow of energy during an overvoltage.

It is observed for completeness that the capacitor 18 charging diode 19 is poled to respond to the same AC source 10 phase (in this case negative) as the polarity of the potential developed across the capacitor 35 (negative) (i.e., to be active when bridge 33 conducts). With reference to FIG. 3B and/or 4B, it will be seen that the AC line is relatively heavily loaded during negative line half cycles by the capacitor 35 and the load 36. The corresponding relatively large current flow in the AC lines during such periods has the effect of reducing line voltage at such times. This, in turn, reduces the voltage applied across the charging resistor 20, which is maximum during such periods since no part of the overvoltage supplied by the source 10 is taken up by the capacitor 18 which is substantially totally discharged during the overvoltage. Thus, the AC line losses during the negative half cycle reduce the power dissipation requirement for the resistor 20.

Referring now to FIG. 5, there is shown a schematic diagram illustrating a radio frequency signal distribution network, e.g., used to distribute television programming via a CATV coaxial cable 60, 60'. The distribution cable 60 quiescently receives power from an AC line source 62 via normally closed contacts 66-a (of relay 66) for distribution to a cascaded series of trunk line amplifiers 70, network line extending amplifiers, and the like. As is typical for the CATV art, trunk line amplifiers 70 are physically spaced along the trunk line coaxial cable 60, 60' to periodically repeat or regenerate the spectrum of signals propagating in one or both directions on the cable network. In addition, signal takeoffs, or feeder lines 89 receive the video or other signals at selected (or all) of the trunk line amplifier 70 positions, and supply (and/or receive) such signal ensembles to local areas, e.g., a group of home viewers along a street, in a neighborhood, an apartment complex, or the like. The distribution or feeder lines 89 may themselves become quite long and require signal amplification. It is thus, fairly common that such lines include radio frequency amplifiers, typically called line extenders.

The trunk line amplifiers 70 (and line extenders where used) include active devices and require power for operation. Accordingly, a standby DC power source 68 may be employed and automatically switched into an operative condition by normally open relay contacts 66-b of relay 66 when an AC threshold detector 64 connected to the cable 60 detects the absence of AC energy on the cable and appropriately activates the relay coil 66. The DC supplied by source 68 then passes on the cable 60 to the various system amplifiers.

In the topography of a composite CATV distribution network, it is usually desirable that only certain of the system amplifiers remain on when the stand-by DC power is employed to prevent undue drain on the stand-by source 68, thereby maximizing the operative duration of the CATV network during periods of AC line power interruption. Thus, for example, it may be desired that all trunk line amplifiers 70 remain energized when the DC source 68 is switched into use, while all line extender amplifiers are disabled. It will be appreciated that AC power is typically introduced at each of several points along the length of a trunk line, effectively subdividing the trunks from a power standpoint. Thus, if only one of such AC sources fails, and stand-by power is used to maintain operative the trunk line amplifiers (only) for that section of trunk, all the remainder of the system (other than the feeder lines associated with the section of trunk lacking AC power) will continue to perform normally.

Turning now to the particular trunk line amplifier 70 depicted in FIG. 5, illustrative of the other trunk line amplifiers employed, there is included a main radio frequency amplifier 78 coupled by capacitors 72 and 87 between the amplifier input (to the left in the drawing) and the amplifier output. The capacitors 72 and 87 act as high pass filters and reject DC and 60 Hz power (it being appreciated that power may flow in either direction along the cable 60, 60'). Where a composite amplifier 70 is used to drive one or more feeder lines 89, a bridge amplifier 80 and signal divider or splitter 83 drive the feeder lines 89.

The trunk line amplifier 70 includes power supply 75 for supplying DC energy for operating the amplifiers 78 and 80. The power supply 75 is for the most part, that repeatedly described above — see, for example, FIG. 4A and the related discussion, the connecting element 38 comprising, for example, a diode 38'. During normal operating conditions, the AC energy present on the line passes through a low pass filter inductor 74 and is converted to DC (negative for the assumed case) across filter capacitor 35 at the output of the transformer secondary winding 32 and the full wave diode bridge 33 by conventional power supply operation (see above). Similarly, during periods of AC line overvoltage, the power supply 75 operates in the manner above discussed, for example, regarding the FIG. 4A arrangement, wherein the diode 38' is turned on during each line negative half cycle such that the power supply 75 continues to activate the amplifiers 78 and 80 while the overvoltage condition persists.

Should the AC source 62 experience a power failure, the DC source 68 is connected into service and supplies the requisite negative potential to the power supply conductor 92 via the coil 74. For trunk line amplifiers 70 which are to stay on during an A.C. failure period, normally open relay contacts 90-a shown in FIG. 5 are not used (or are short circuited as shown by dotted line). Thus for such trunk line amplifiers 70, the stand-by DC potential is supplied via the serially connected transformer primary 31, diode 38' and diode 41 to the capacitor 35, and thence to the power supply amplifier loads 78 and 80. These amplifiers thus remain operative.

It is noted that the diodes 19 and 27 are oppositely poled in FIG. 5 vis-a-vis FIG. 4A. This has the effect of rendering the controlled switch 29 non-conductive during the DC stand-by power period, as required to disconnect the lower end of winding 31 from ground at such time.

Consider now the case of a trunk line amplifier 70 or, more likely, a line extender or other amplifier included in a distribution line 89 which is not to remain operative when stand-by power is in service. (Network power coupling coils 82 and 84 connecting the trunk and feeder lines.) For such an amplifier or like active arrangement, a relay 90 is employed. The coil 90 is activated by positive AC line half-cycle during normal and overvoltage AC conditions by a line polarity selecting diode 93 and filter capacitor 91 (i.e., a line polarity opposite to the stand-by DC potential). Thus, the composite power supply circuitry 75 is fully operative during normal and overvoltage AC in the manner above-discussed. That is, the closed relay contents 90-a couple the negative line half waves to diodes 38' and 41 during an AC overvoltage and the closed contacts 90-b supply to the feeder lines 89 wherever AC power is present.

However, during AC line power faults, diode 93 blocks the negative source 68 — supplied stand-by voltage. Then, the relay coil 90 is not energized and the contacts 90-a,b are open, thereby disabling the station and feeder lines, respectively.

Accordingly, the FIG. 5 arrangement has been shown by the above to accommodate normal and overvoltage AC line power conditions, and to provide flexible apparatus for maintaining operative selected, more critical system amplifiers during periods when stand-by power is being utilized. Moreover, the power supplier 75 utilizes the DC stand-by power directly — thus obviating the cost and inefficiencies inherent in DC-to-AC converters.

The above described arrangements are merely illustrative principles of the present invention. Numerous modifications and adaptation thereof will be readily apparent to those skilled in the art without departing from the spirit and scope of the present invention.

What is claimed is:

1. In combination, a transformer including primary and secondary windings, controlled bidirectional switch means connected to one terminal of said transformer primary winding, rectifier means connected to said transformer secondary winding, first and second circuit terminals adapted for connection to an energy source, means for quiescently biasing said controlled bidirectional switch means to a conductive state, means responsive to the AC potential obtaining between said first and second energy receiving circuit terminals exceeding predetermined upper and lower bounds for disabling conduction in said bidirectional controlled switch means, and coupling means connected to the junction between said transformer primary winding and said controlled bidirectional switch means for supplying potential to said rectifier means when an AC overvoltage or a DC voltage condition is present between said first and second terminals.

2. A combination as in claim 1, wherein said transformer primary - rectifier coupling means comprises a controlled switch, and gating means for gating said controlled switch conductive responsive to an overvoltage AC or to a DC potential supplied to said first and second circuit terminals.

3. A combination as in claim 1, further comprising AC and DC stand-by energy sources, first switching means for normally connecting said AC source to said first and second circuit terminals, and means responsive to said AC source failing for connecting said DC stand-by source to said first and second circuit terminals.

4. A combination as in claim 1 wherein said bidirectional switch means comprises a triac.

5. A combination as in claim 4 further comprising means for supplying an AC potential to said first and second terminals adapted therefor.

6. A combination as in claim 5 wherein said triac quiescent energizing means comprises a capacitor and a capacitor charging network serially connected between said first and second AC receiving terminals, and means connecting said capacitor and the gate of said triac.

7. A combination as in claim 6 further comprising a first additional triac connected in parallel with said capacitor, and threshold voltage conducting means connecting between the gate of said additional triac and said AC source.

8. A combination as in claim 7 further comprising a resistor connected between the junction of said transformer primary winding and said triac, and said capacitor.

9. A combination as in claim 8 further comprising a further capacitor connected to said rectifier, and a load connected across said capacitor.

10. A combination as in claim 2 wherein said controlled switch includes a triac.

11. A combination as in claim 1, further comprising AC source means, DC source means, cable distribution means connected to said first and second circuit terminals, and switch means for normally connecting, said AC source means to said cable means responsive to a failure of said AC source means.

12. In combination, a radio frequency signal distribution system including a distribution cable network and plural amplifiers included within said cable network, AC and stand-by DC power sources, means for normally connecting said AC source to said cable network and for connecting said DC stand-by source to said cable network when said AC source fails, each of said amplifiers including a power supply, said amplifier power supplies including power receiving terminals, transformer primary and secondary windings, first controlled switch means for connecting said transformer primary winding across said power receiving terminals, rectifier means, power maintaining means connecting said power receiving terminals with said rectifier means, and means for disabling said first controlled switch means when DC potential is being supplied to said power receiving terminals.

13. A combination as in claim 12, wherein said power maintaining means includes unidirectional conducting means.

14. A combination as in claim 13, wherein at least one of said amplifier power supplies includes means for disabling said power maintaining means when DC potential is being supplied to said power receiving terminals.

15. A combination as in claim 12, wherein subsets of said amplifier power supplies include means for rendering said power maintaining means conductive and nonconductive, respectively, when DC potential is being supplied to said power receiving terminals.

16. A combination as in claim 15, wherein said amplifier power supplies further include means responsive to an overrange AC potential appearing at said power receiving terminals for disabling said first controlled switch means.

17. A combination as in claim 13, wherein said amplifier power supplies further include means responsive to an overrange AC potential appearing at said power receiving terminals for disabling said first controlled switch means.

18. A combination as in claim 14, wherein said amplifier power supplies further include means responsive to an overrange AC potential appearing at said power receiving terminals for disabling said first controlled switch means.

* * * * *